US 7,703,722 B2

Apr. 27, 2010

(12) United States Patent
Bucciferro et al.

(10) Patent No.: US 7,703,722 B2
(45) Date of Patent: Apr. 27, 2010

(54) COMMON BONDING NETWORK CLAMP

(75) Inventors: Robert G. Bucciferro, Joliet, IL (US); Christopher R. Haczynski, Crown Point, IN (US); Robert W. Kossak, Lemont, IL (US)

(73) Assignee: Panduit Corp., Tinley Park, IL (US)

( * ) Notice: Subject to any disclaimer, the term of this patent is extended or adjusted under 35 U.S.C. 154(b) by 35 days.

(21) Appl. No.: 12/044,005

(22) Filed: Mar. 7, 2008

(65) Prior Publication Data
US 2008/0217490 A1 Sep. 11, 2008

Related U.S. Application Data

(60) Provisional application No. 60/893,713, filed on Mar. 8, 2007.

(51) Int. Cl.
*F16L 3/00* (2006.01)

(52) U.S. Cl. .................. 248/49; 248/74.1; 248/229.23; 248/230.4; 248/231.51

(58) Field of Classification Search ............... 248/74.1, 248/49, 229.13, 229.23, 228.4, 230.4, 231.51; 411/366.1, 914; 403/390; 439/779; 52/126.2, 52/220.5, 263
See application file for complete search history.

(56) References Cited

U.S. PATENT DOCUMENTS

| 1,873,559 | A |   | 8/1932  | Dibner         |
|-----------|---|---|---------|----------------|
| 2,137,834 | A |   | 11/1938 | Dibner         |
| 2,180,931 | A |   | 11/1939 | Rogoff         |
| 2,450,158 | A |   | 9/1948  | Pennell        |
| 2,597,037 | A |   | 5/1952  | Runde          |
| 2,830,353 | A |   | 4/1958  | Barlow         |
| 2,885,776 | A | * | 5/1959  | Pellier ............... 29/417 |
| 3,340,581 | A | * | 9/1967  | Engman et al. ........... 24/276 |
| 3,423,113 | A | * | 1/1969  | Dosso et al. ............ 403/217 |
| 3,633,254 | A | * | 1/1972  | Hoglund et al. ........... 24/276 |
| 3,652,780 | A | * | 3/1972  | Wilson .................. 174/45 R |
| 3,901,577 | A | * | 8/1975  | Philibert et al. ......... 439/804 |
| 3,913,188 | A | * | 10/1975 | Grassi .................... 24/276 |
| 3,943,817 | A |   | 3/1976  | Mess           |
| 4,079,481 | A |   | 3/1978  | Cacicedo       |
| 4,114,977 | A |   | 9/1978  | Polidori       |
| 4,147,446 | A |   | 4/1979  | Frank, Jr.     |
| 4,405,827 | A |   | 9/1983  | Mixon, Jr.     |

(Continued)

FOREIGN PATENT DOCUMENTS

EP 0871244 A2 10/1998

*Primary Examiner*—Korie H. Chan
(74) *Attorney, Agent, or Firm*—Robert A. McCann; Christopher S. Clancy; Aimee E. McVady

(57) ABSTRACT

A clamp used to create a bond between under floor wiring systems and a common bonding network. The clamp includes a mounting plate, a U-bolt and a split bolt for securing wires to the mounting plate. The mounting plate has an aperture and a slot. The U-bolt has a first end and a second end. The first end of the U-bolt is attached at the aperture of the mounting plate and the second end of the U-bolt is positioned within the slot of the mounting plate. The second end of the U-bolt is removed from the slot to enable the second end of the U-bolt to pivot away from the mounting plate enabling the U-bolt to engage a floor pedestal.

9 Claims, 10 Drawing Sheets

U.S. PATENT DOCUMENTS

| | | | |
|---|---|---|---|
| 4,575,985 A * | 3/1986 | Eckenrodt | 52/677 |
| 4,863,390 A | 9/1989 | Cera et al. | |
| 4,911,572 A | 3/1990 | Williams | |
| 4,915,653 A | 4/1990 | Mair | |
| 4,976,627 A * | 12/1990 | O'Loughlin | 439/100 |
| 5,151,560 A | 9/1992 | Kreinberg et al. | |
| 5,152,701 A | 10/1992 | Polidori | |
| 5,236,377 A * | 8/1993 | Goto | 439/779 |
| 5,265,386 A | 11/1993 | Mühlethaler | |
| 5,320,565 A | 6/1994 | Polidori | |
| 5,477,649 A | 12/1995 | Bessert | |
| 5,501,754 A | 3/1996 | Hiraguri | |
| 5,548,932 A | 8/1996 | Mead | |
| 5,566,916 A | 10/1996 | Bailey | |
| 5,616,036 A | 4/1997 | Polidori | |
| 5,632,633 A | 5/1997 | Roosdorp et al. | |
| 5,687,938 A | 11/1997 | Bailey | |
| 5,888,104 A * | 3/1999 | Mello et al. | 439/785 |
| 5,934,818 A | 8/1999 | Schmitt et al. | |
| 6,040,525 A | 3/2000 | Chauquet et al. | |
| 6,116,969 A | 9/2000 | Piriz | |
| 6,431,502 B1 | 8/2002 | Goodman | |
| 6,463,704 B1 | 10/2002 | Jette | |
| 6,486,402 B2 | 11/2002 | Harger et al. | |
| 6,581,791 B2 * | 6/2003 | Flint et al. | 213/1.3 |
| 6,918,217 B2 | 7/2005 | Jakob-Bamberg et al. | |
| 6,986,673 B2 | 1/2006 | De La Borbolla | |
| 7,168,212 B2 | 1/2007 | Jette | |
| 2004/0172024 A1 * | 9/2004 | Gorek | 606/61 |
| 2005/0249571 A1 | 11/2005 | Whipple et al. | |

* cited by examiner

COMMON BONDING NETWORK CLAMP

CROSS REFERENCE TO RELATED APPLICATION

This application claims priority from U.S. Provisional Patent Application No. 60/893,713, filed Mar. 8, 2007, the entire disclosure of which is hereby incorporated by reference.

FIELD OF THE INVENTION

The present invention relates to a clamp, and more particularly to a common bonding network clamp for an under floor wiring system.

BACKGROUND OF THE INVENTION

As data centers become more complicated, the utilization of floor space in the data center has become more critical. As a result, common bonding networks have been installed under raised floors. Raised floors are a cost effective and efficient solution for wire and cable management. In the under floor network a bond must be created between the floor pedestal and the common bonding network. The current bonding clamp typically used in under floor wiring systems includes a U-bolt with two threaded ends. The U-bolts are typically secured to floor pedestals by a clamp and various fasteners. The installation of this current bonding clamp, however, is often difficult and time consuming because the fasteners securing the U-bolt must be individually installed to enable the U-bolt to be installed around the floor pedestal. Additionally, to remove the clamp from the floor pedestal, the fasteners must be individually removed from the U-bolt before the clamp may be removed. Thus, it is desirable to provide a common bonding network clamp that creates a bond between the floor pedestal and the common bonding network and that is cost effective and easy to install.

SUMMARY

A clamp is disclosed to create a bond between under floor wiring systems and a common bonding network. The clamp includes a mounting plate, a U-bolt connected to the mounting plate and a split bolt for securing wires to the mounting plate. The mounting plate includes an aperture and a slot. The U-bolt includes a first end attached at the aperture of the mounting plate and a second end positioned within the slot of the mounting plate. The second end of the U-bolt is secured to the mounting plate by a flange nut. The flange nut is loosened to remove the second end of the U-bolt from the slot to enable the second end of the U-bolt to pivot away from the mounting plate. The U-bolt receives a floor pedestal to secure the clamp to an under floor wiring system.

DETAILED DESCRIPTION

Figure 1:
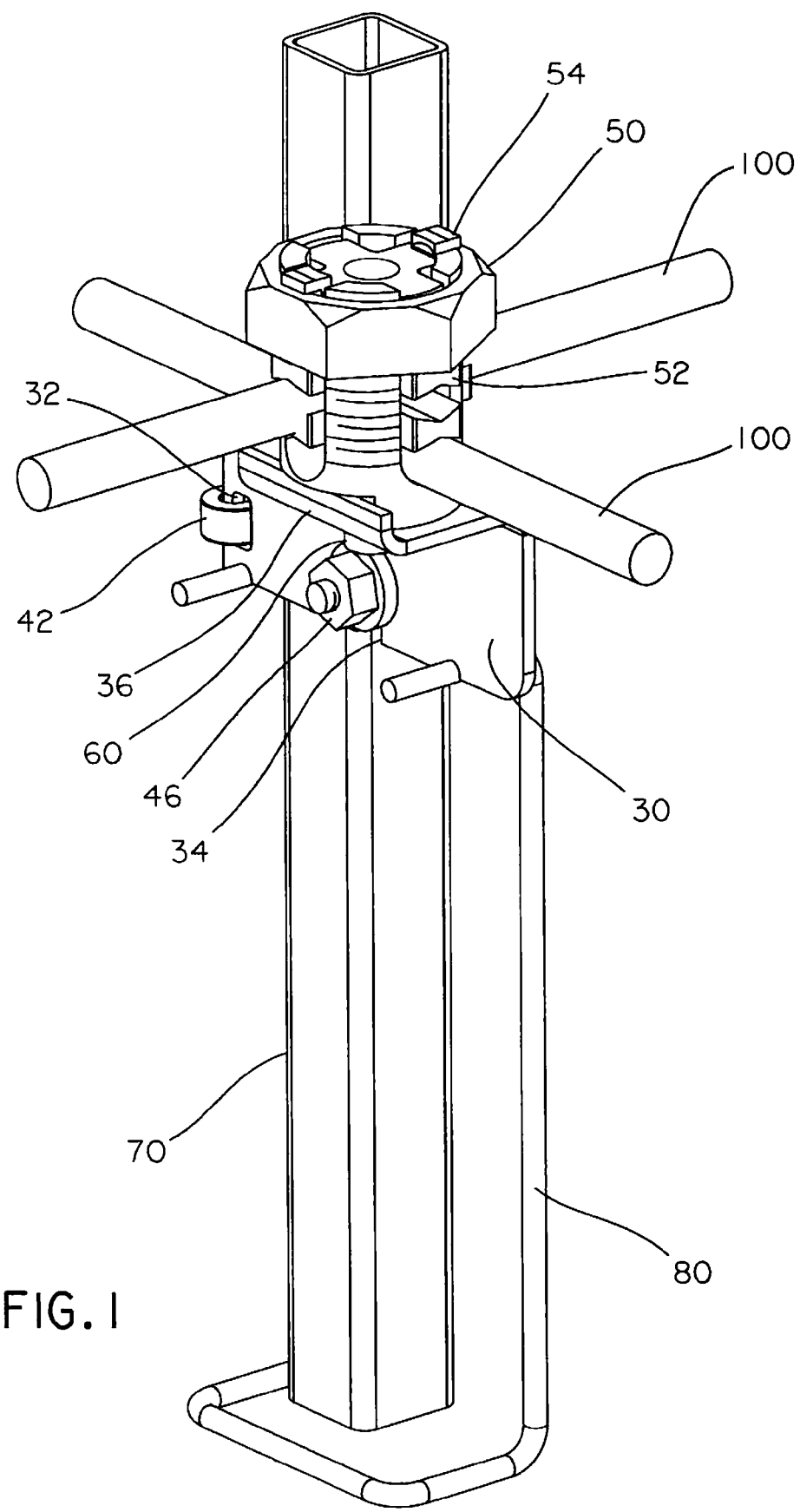
FIG. 1 is a front perspective view of the common bonding network clamp of the present invention secured to an access floor pedestal.

FIGS. 1-9 illustrate the common bonding network clamp 20 of the present invention attached to an access floor pedestal 70 for an under floor wiring system. The common bonding clamp is made of copper to provide a low resistance, all copper pathway connection, however, the clamp may be made from other materials. The common bonding network clamp 20 includes a mounting plate 30, a U-bolt 40 and a split bolt 50.

Figure 4:
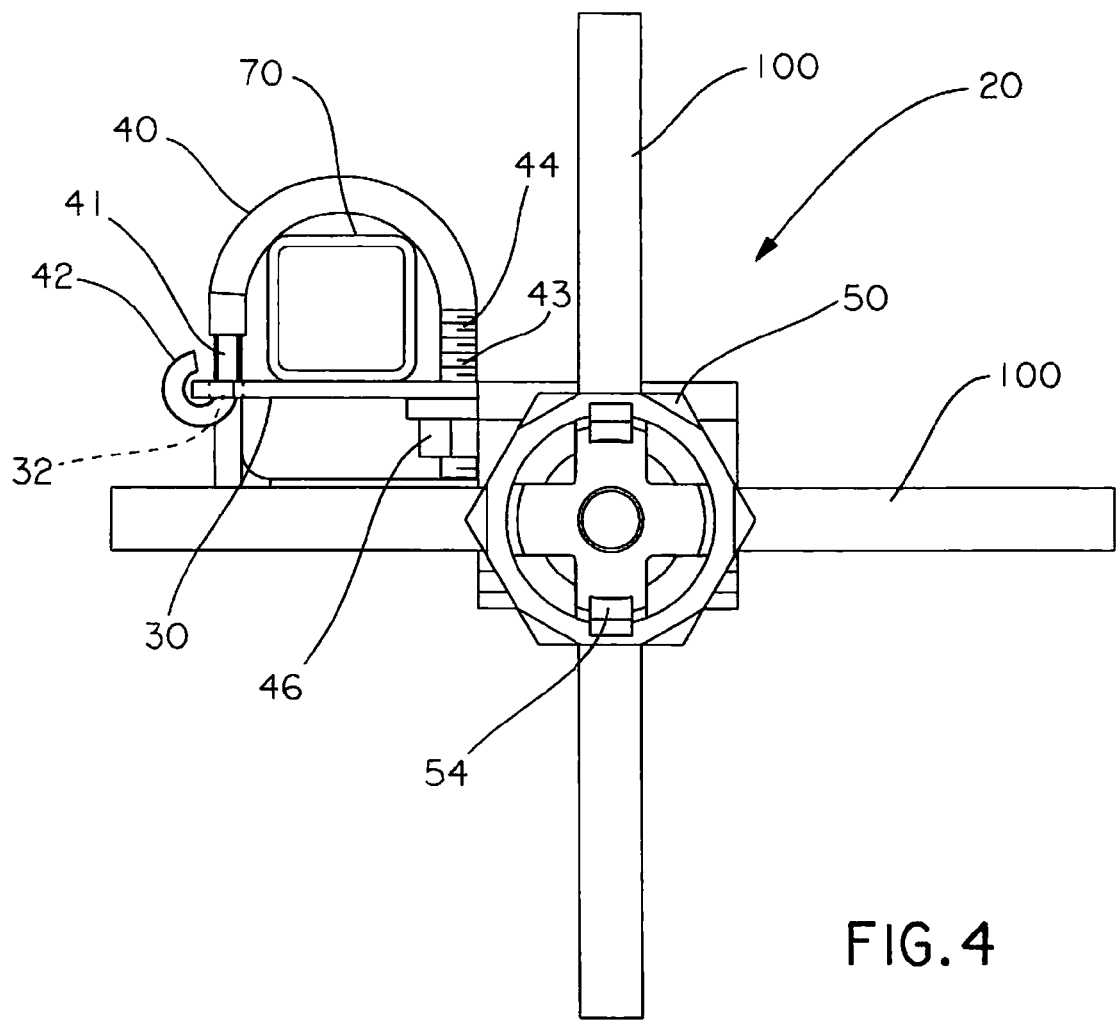
FIG. 4 is a top view of the common bonding network clamp of FIG. 1.
Figure 5:
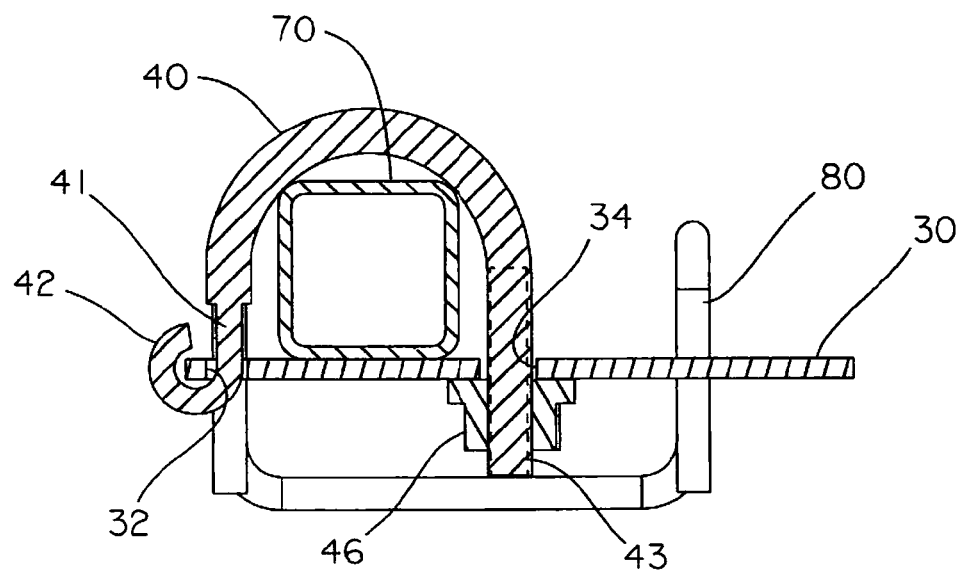
FIG. 5 is a cross sectional view of the common bonding network clamp of FIG. 2 taken along line 5-5.

As illustrated in FIGS. 4 and 5, a first end 41 of the U-bolt 40 includes a hinge 42 and the second end 43 of the U-bolt 40 is threaded 44 for receiving a fastener 46, for example, a serrated flange nut. The mounting plate 30 includes an opening or aperture 32 for receiving the hinge 42 at the first end 41 of the U-bolt 40. The hinge 42 is crimped on the mounting plate 30 to create a captive U-bolt 40. Thus, the U-bolt 40 is pivotally connected to the mounting plate 30 (see FIGS. 7-9). Alternatively, the first end of the U-bolt may be threaded and secured to the mounting plate by a flange nut.

Figure 6:
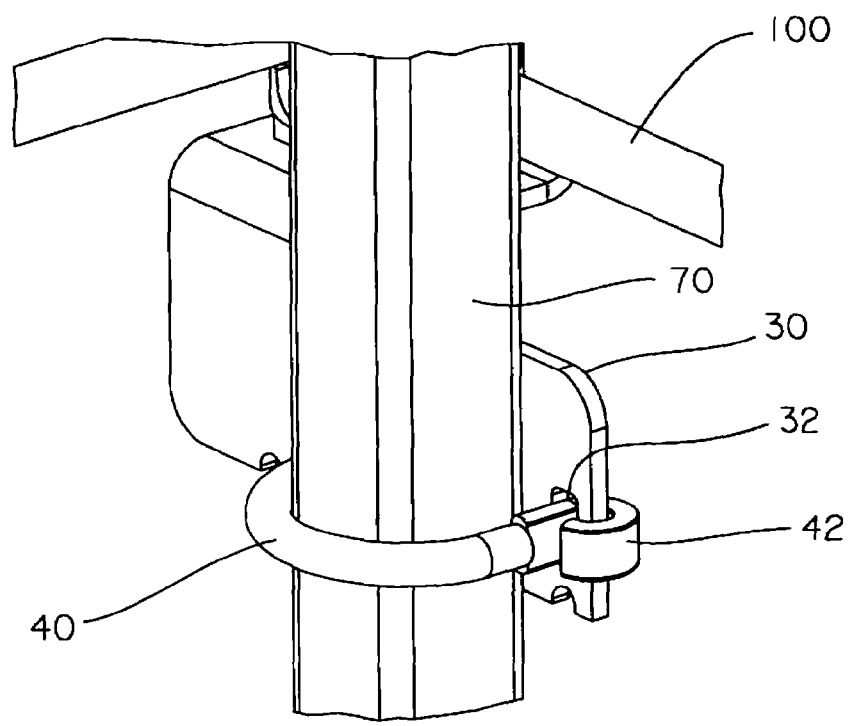
FIG. 6 is a partial rear perspective view of the common bonding network clamp of FIG. 1.
Figure 7:
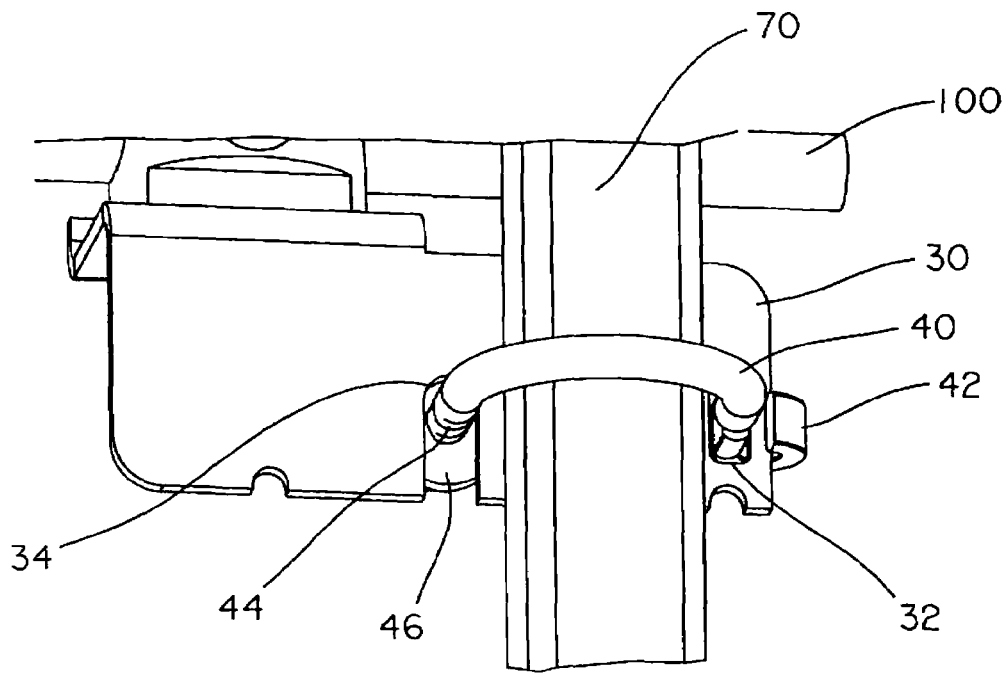
FIG. 7 is a partial rear perspective view of the common bonding network clamp of FIG. 1.
Figure 8:
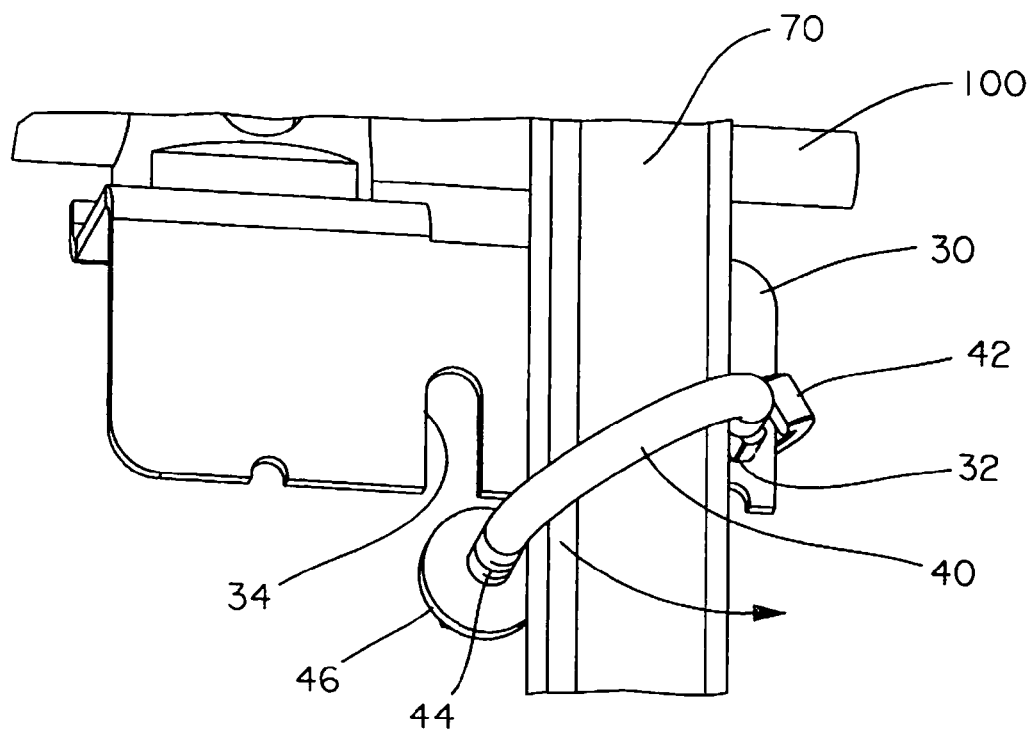
FIG. 8 is a rear perspective view of FIG. 7 with the U-bolt partially rotated from the mounting plate.
Figure 9:
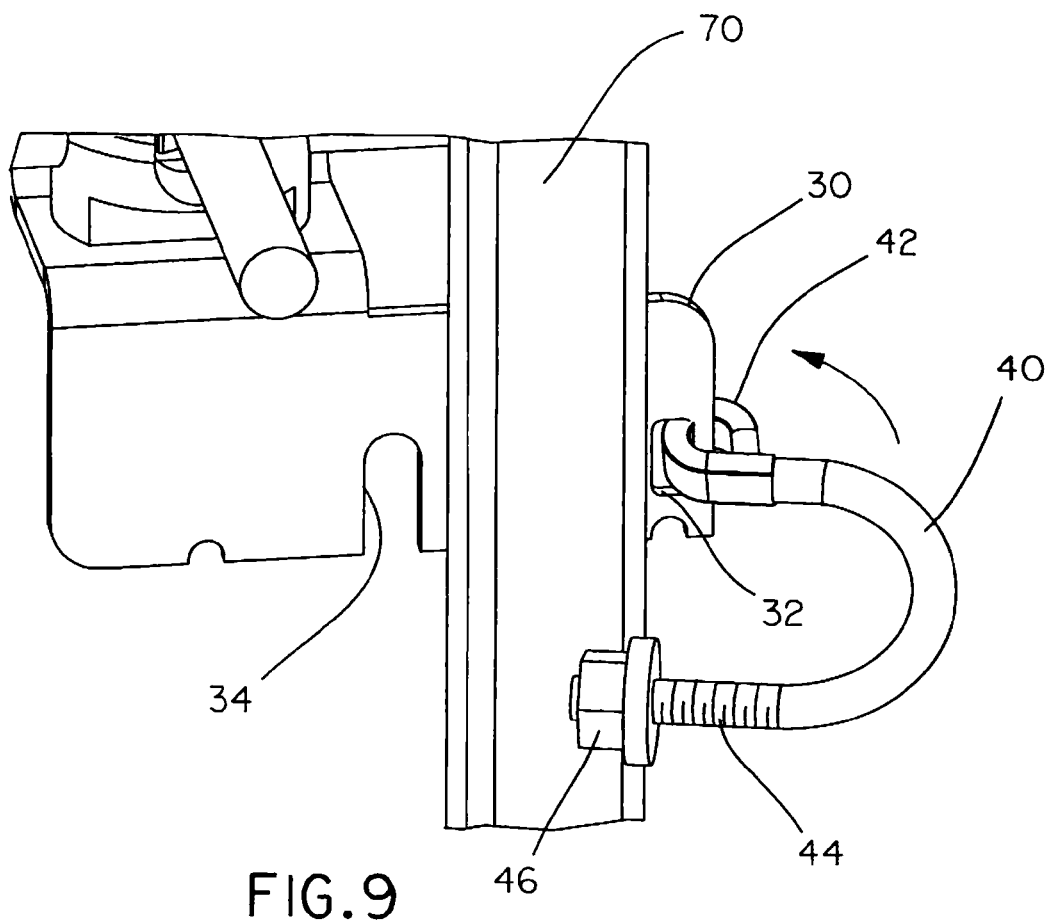
FIG. 9 is a rear perspective view of FIG. 7 with the U-bolt rotated from the mounting plate.
Figure 10:
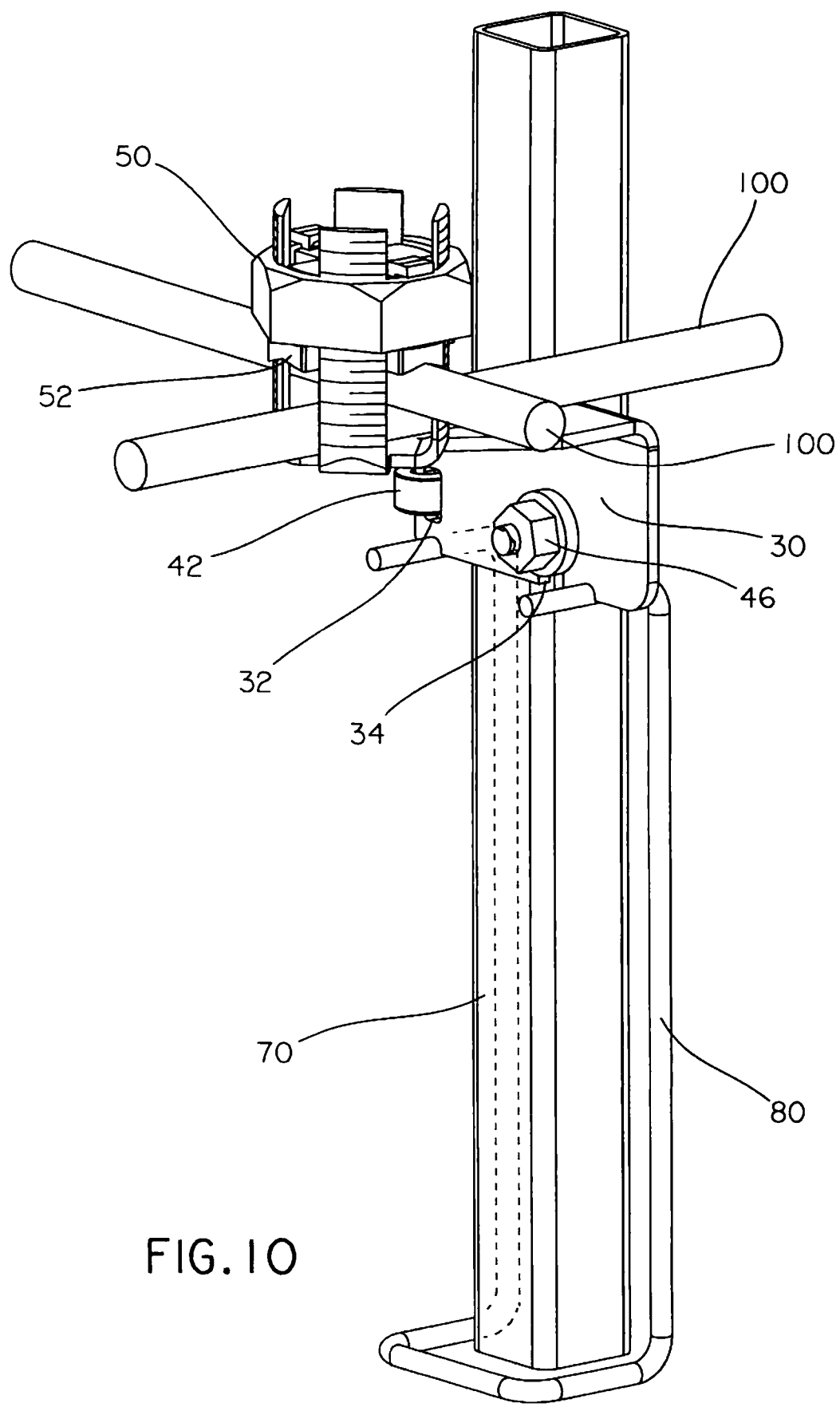
FIG. 10 is a front perspective view of an alternative embodiment of the common bonding network clamp of FIG. 1.
Figure 11:
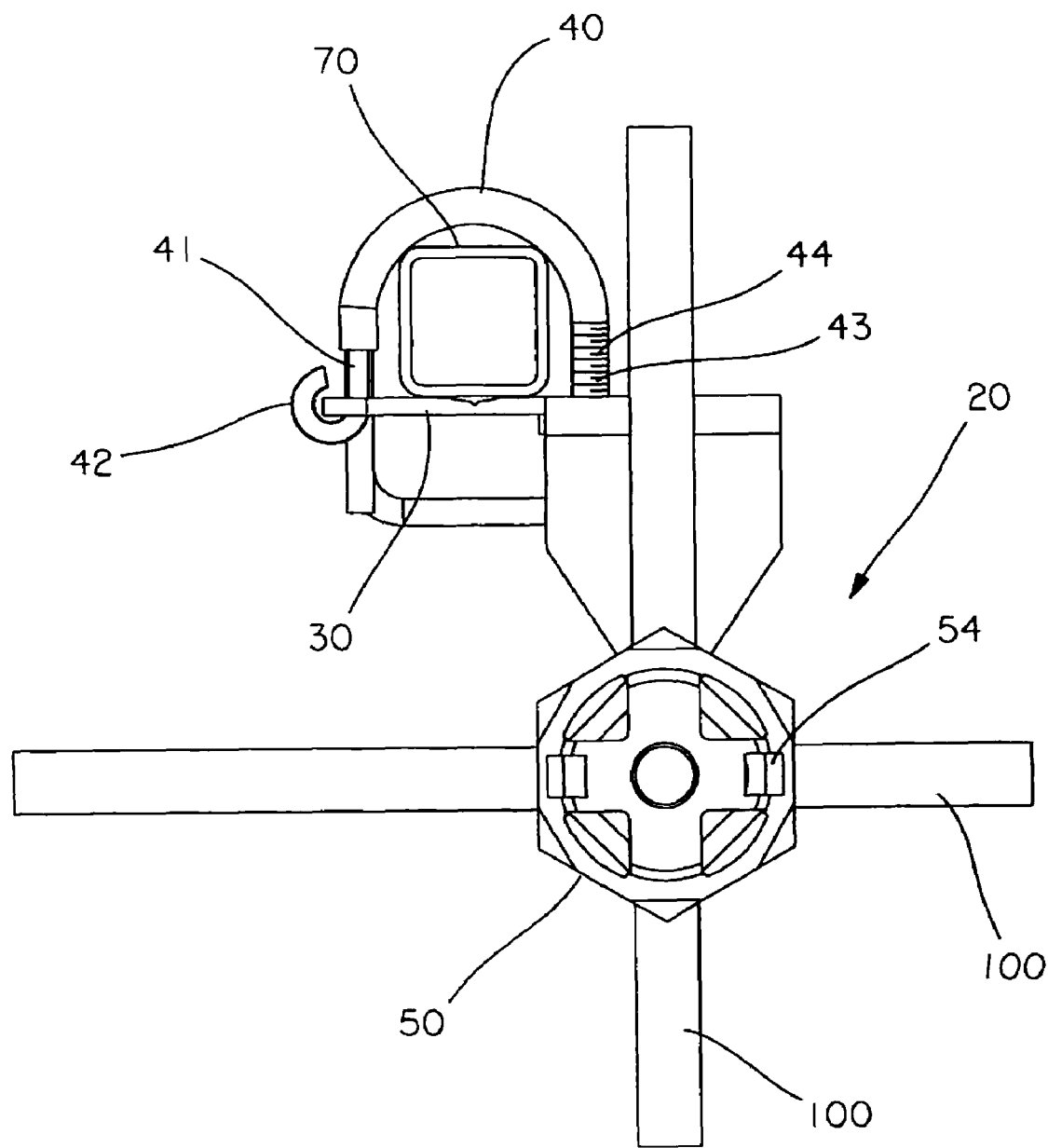
FIG. 11 is a top view of the common bonding network clamp of FIG. 10.
Figure 12:
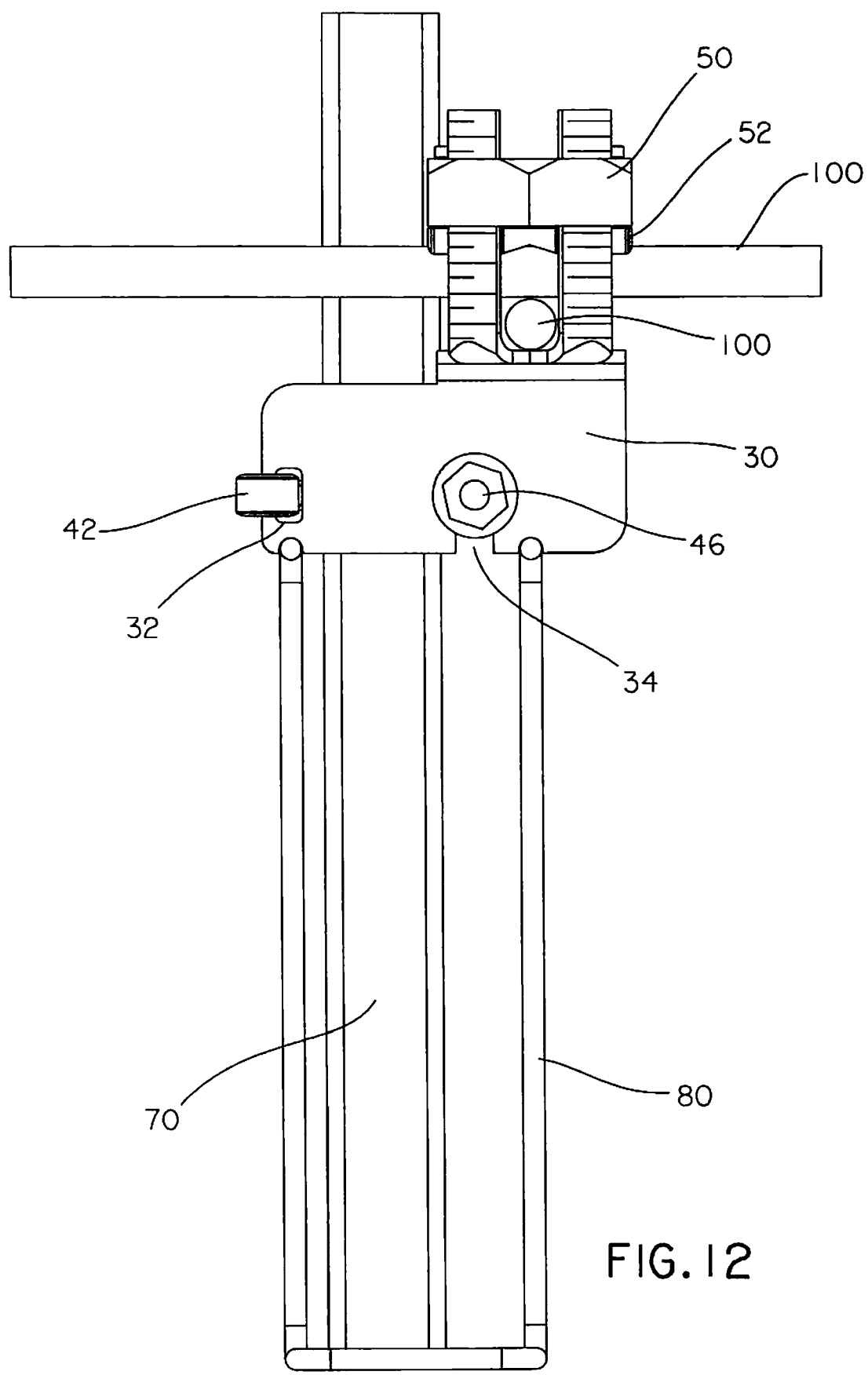
FIG. 12 is a front view of the common bonding network clamp of FIG. 10.
Figure 13:
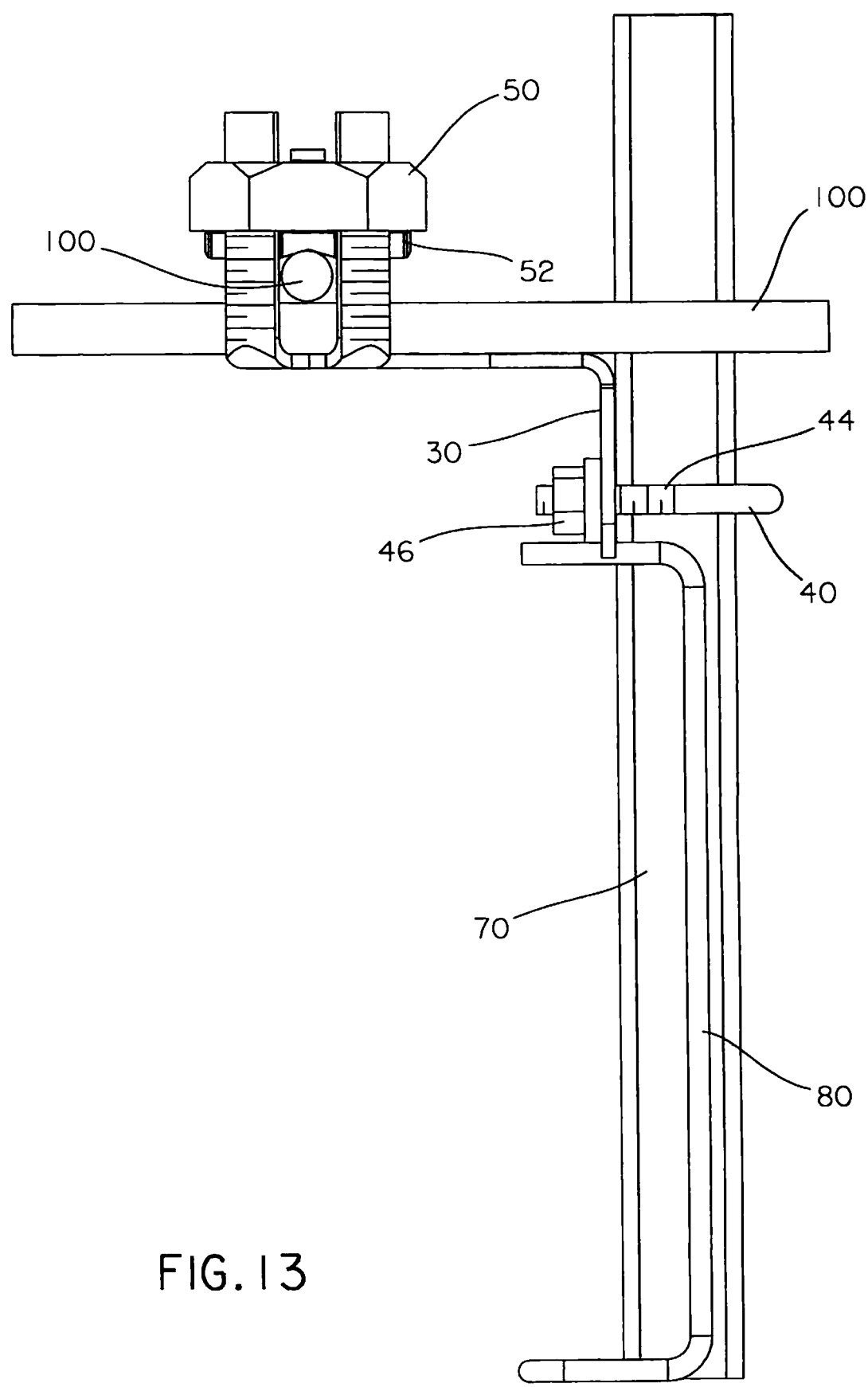
FIG. 13 is a side view of the common bonding network clamp of FIG. 10.

The mounting plate 30 includes a slot 34 (see FIG. 2) that receives the threaded end 44 of the U-bolt 40. As illustrated in FIGS. 6 and 7, when the common bonding network clamp 20 is installed around a raised floor pedestal 70, the U-bolt 40 is positioned around the floor pedestal 70 and the threaded end 44 of the U-bolt 40 is positioned in the slot 34 in the mounting plate 30. A serrated flange nut 46 that has been installed on the threaded end of the U-bolt 40 is tightened to secure the U-bolt 40 to the mounting plate 30. As illustrated in FIGS. 8 and 9, to remove the U-bolt 40, the flange nut 46 is moved along the threaded end until the U-bolt 40 is loose and can pivot away from mounting plate 30 and the floor pedestal 70. Thus, the slot 34 in the mounting plate 30 enables the U-bolt 40 to be quickly installed around the access floor pedestal 70 because the U-bolt 40 may be tightened around the floor pedestal 70 without removing the U-bolt 40 from the mounting plate 30 or without removing the serrated flange nut 46 from the U-bolt 40.

The U-bolt 40 and mounting plate 30 may be secured to access floor pedestals of various shapes and sizes, for example, a floor pedestal that is round or square.

Figure 2:
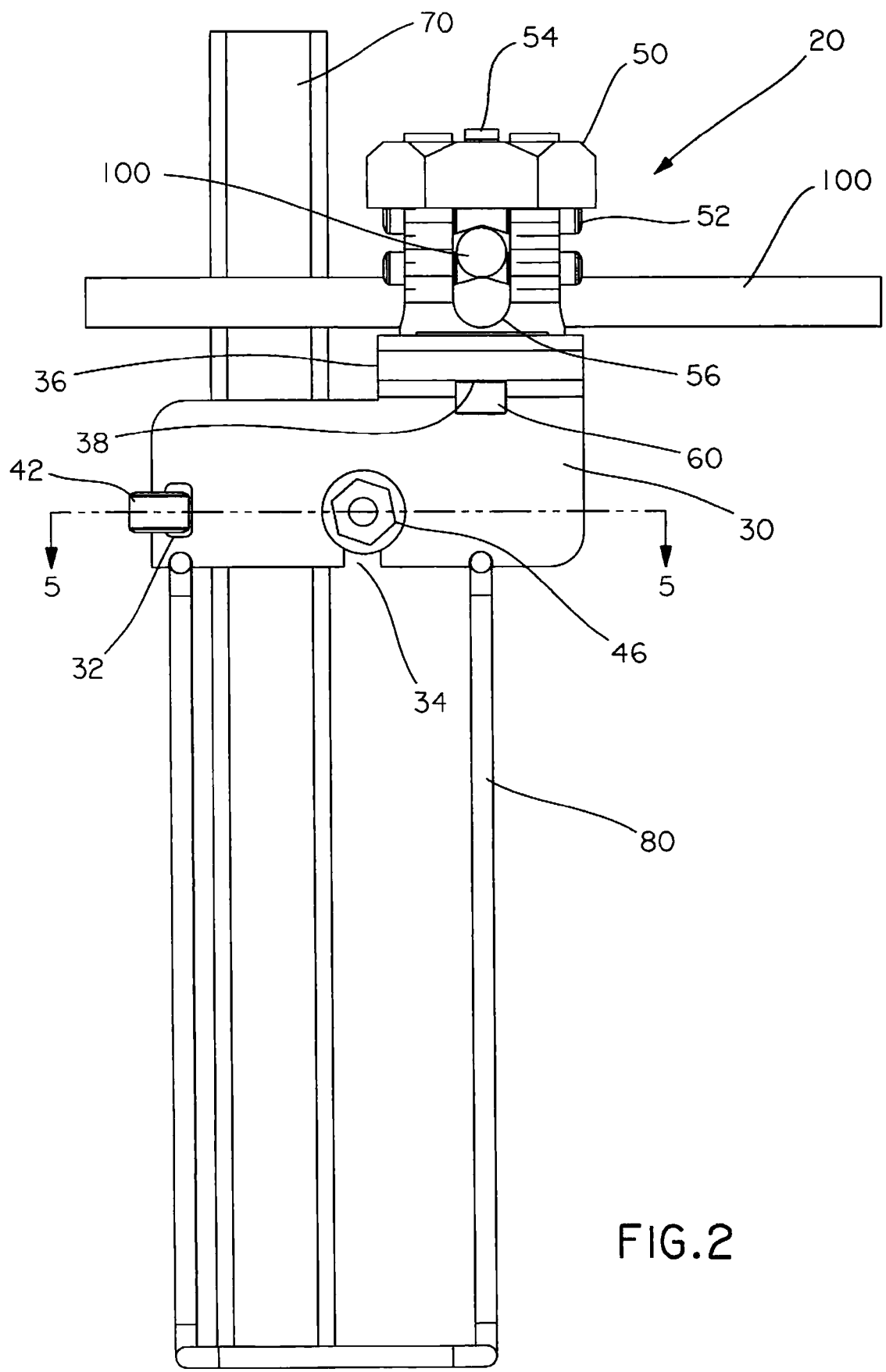
FIG. 2 is a front view of the common bonding network clamp of FIG. 1.
Figure 3:
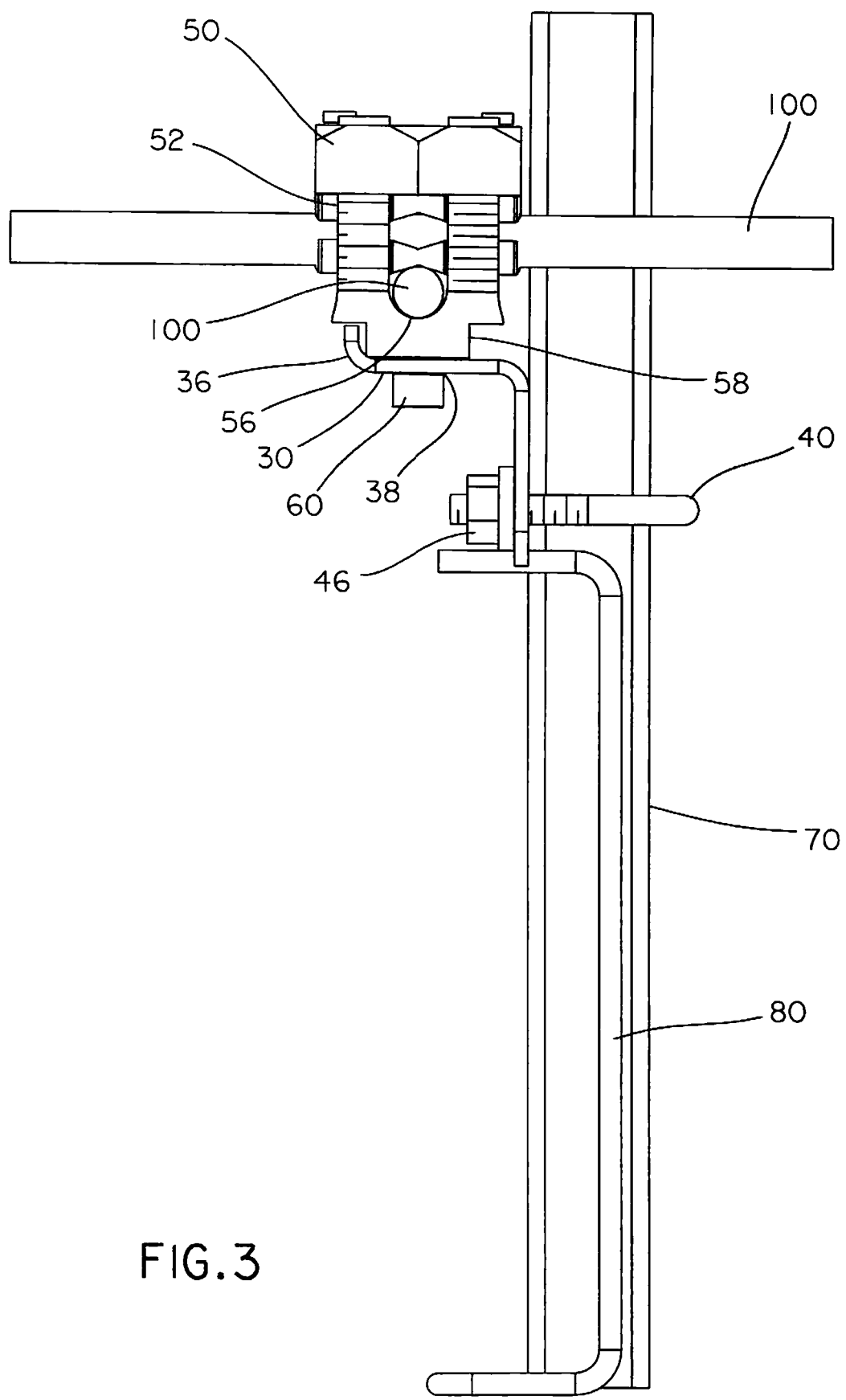
FIG. 3 is a side view of the common bonding network clamp of FIG. 1.

As illustrated in FIGS. 1-3, the mounting plate 30 also includes a lip 36 and an opening or aperture 38 for receiving the split bolt 50. The split bolt 50 is positioned in the opening 38 in the mounting plate 30 and secured thereto via a fastener 60. The mounting plate 30 is designed to space the split bolt 50 from the U-bolt 40 and the attached floor pedestal 70 to enable the split bolt 50 to accommodate the common bonding wires 100.

The split bolt 50 includes a cross-shaped body to enable the bolt to accommodate two perpendicular common bonding wires 100 thereby creating an electrical bond between the wires. The split bolt 50 includes at least one pressure plate 52. The pressure plate 52 is cross-shaped to add strength and reduce deflection or deformation of the split bolt 50 during installation. The cross-shape of the pressure plate 52 also provides grooves to accept the wires 100 to increase the contact surface area and provide a superior electrical bond. The size and shape of the pressure plate 52 may vary to accommodate a range of wire gauges. The top of the split bolt 50 includes a number of bent tabs 54 for securing the pressure plate 52 to the split bolt 50. The split bolt 50 also includes a groove 56 that is designed to accommodate different wire gauges and to increase the contact surface area between the split bolt 50 and the wires 100.

As shown in FIG. 3, the bottom of the split bolt 50 includes a flat area 58. The flat area 58 accepts a standard wrench to facilitate installation of the split bolt 50 to the mounting plate 30. The flat area 58 of the split bolt 50 and the mounting plate lip 36 combine to create an anti-rotation feature.

A freestanding height gauge 80 is used during the installation of the clamp 20. The height gauge 80 insures that all of the clamps 20 in the under floor wiring system are installed at the same height. The clamp 20 creates all electrical bond between the floor pedestal 70 and the wires 100 regardless of the height of the two crossing wires 100. Thus, the freestanding height gauge 80 also facilitates installation of the common bonding network clamps 20.

FIGS. 10-13 illustrate an alternative embodiment of the common bonding network clamp of the present invention. In the alternative embodiment, the split bolt 50 is integrally formed with the mounting plate 30.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

The invention claimed is:

1. A clamp comprising:
   a mounting plate having an aperture and a slot;
   a U-bolt connected to the mounting plate, wherein the U-bolt is disposed along a plane and has a first end and a second end, the first end is attached at the aperture of the mounting plate and the second end is positioned within the slot of the mounting plate; and
   a split bolt connected to the mounting plate for securing wires to the mounting plate; wherein the split bolt extends in a plane traversing the plane of the U-bolt.

2. The clamp of claim 1, wherein at least one of the first and second ends of the U-bolt is threaded.

3. The clamp of claim 1, wherein the first end of the U-bolt is a hinge.

4. The clamp of claim 1, wherein the second end of the U-bolt is secured to the mounting plate by a flange nut.

5. The clamp of claim 1, wherein the U-bolt receives a floor pedestal to secure the clamp to an under floor wiring system.

6. The clamp of claim 1, wherein the split bolt secures wires in a perpendicular orientation.

7. The clamp of claim 1, wherein the split bolt includes a crossed shaped pressure plate.

8. The clamp of claim 1, wherein the split bolt is secured to the mounting plate by fasteners.

9. The clamp of claim 1, wherein the split bolt is integral with the mounting plate.

* * * * *